United States Patent
Kwon et al.

(10) Patent No.: US 8,730,368 B2
(45) Date of Patent: May 20, 2014

(54) LIGHT TRANSMITTANCE ADJUSTING DEVICE, IMAGE APPARATUS INCLUDING THE SAME, AND METHOD OF FABRICATING THE LIGHT TRANSMITTANCE ADJUSTING DEVICE

(75) Inventors: Jong-oh Kwon, Suwon-si (KR); Che-heung Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/397,371

(22) Filed: Feb. 15, 2012

(65) Prior Publication Data
US 2013/0016271 A1    Jan. 17, 2013

(30) Foreign Application Priority Data
Jul. 14, 2011   (KR) .................. 10-2011-0070033

(51) Int. Cl.
*H04N 5/225*   (2006.01)
*G03B 9/08*    (2006.01)
*G03B 9/32*    (2006.01)
*H02N 2/00*    (2006.01)

(52) U.S. Cl.
USPC ........... 348/335; 396/452; 396/449; 396/480; 310/365

(58) Field of Classification Search
USPC ............. 348/208.99, 208.7, 208.8, 208.11, 348/208.12, 335; 396/452, 449
See application file for complete search history.

(56) References Cited

U.S. PATENT DOCUMENTS

| | | | |
|---|---|---|---|
| 6,903,872 B2* | 6/2005 | Schrader | 359/572 |
| 7,619,837 B2* | 11/2009 | Choi et al. | 359/811 |
| 7,719,167 B2* | 5/2010 | Kwon et al. | 310/328 |
| 2007/0097528 A1* | 5/2007 | Hagiwara et al. | 359/819 |
| 2008/0084498 A1 | 4/2008 | He et al. | |

FOREIGN PATENT DOCUMENTS

| | | |
|---|---|---|
| JP | 2009-134248 A | 6/2009 |
| KR | 10-2010-0122833 A | 11/2010 |
| KW | 10-2008-0087005 A | 9/2008 |
| WO | WO 96/35967 A1 | 11/1996 |

OTHER PUBLICATIONS

Elastomeric optical elements with deformable surface topographies: application to force measurement, tunable light transmission and light focusing—By Bartosz Grzybowski, Dong Qin, Rainer Haag, George M. WHitesides. Sensors and Actuators 86 (2000) 81-85.*
Wei Yuan et al, Fault-Tolerant Dielectric Elastomer Actuators using Single-Walled Carbon Nanotube Electrodes**, Adv. Mater. Jan. 17, 2008, 20, pp. 621-625.

* cited by examiner

*Primary Examiner* — Twyler Haskins
*Assistant Examiner* — Padma Haliyur
(74) *Attorney, Agent, or Firm* — Sughrue Mion, PLLC (57) ABSTRACT

A light transmittance adjusting device is provided, including a first electrode, a second electrode, and a first elastomer layer disposed between the first and second electrodes. A light transmittance of the first elastomer layer is variable depending on a voltage applied thereto.

18 Claims, 8 Drawing Sheets

FIG. 7 ively low volume" —

LIGHT TRANSMITTANCE ADJUSTING DEVICE, IMAGE APPARATUS INCLUDING THE SAME, AND METHOD OF FABRICATING THE LIGHT TRANSMITTANCE ADJUSTING DEVICE

CROSS-REFERENCE TO RELATED APPLICATION

This application claims priority from Korean Patent Application No. 10-2011-0070033, filed on Jul. 14, 2011, in the Korean Intellectual Property Office, the disclosure of which is incorporated herein in its entirety by reference.

BACKGROUND

1. Field

Apparatuses and methods consistent with exemplary embodiments relate to light transmittance adjusting devices using elastomer layers, imaging apparatuses including the light transmittance adjusting devices, and methods of manufacturing the light transmittance adjusting devices.

2. Description of the Related Art

A technology of adjusting and controlling light transmittance is widely used in an aperture or a shutter in imaging apparatuses.

A movable aperture that is generally used in a related art optical system is driven by operating a plurality of metal blades; however, mechanical movements, frictional forces, and usage of movable mechanical elements limit miniaturization.

In particular, in manufacturing high image quality camera modules for mobile devices, concerns about shutters and apertures are increasing. However, mechanical shutters and apertures currently used in cameras have large volumes. Thus, shutters and apertures with volumes lower than those of currently used shutters and apertures need to be developed.

SUMMARY

One or more exemplary embodiments provide light transmittance adjusting devices having relatively low volumes by using elastomer layers.

One or more exemplary embodiments provide imaging apparatuses including the light transmittance adjusting devices.

One or more exemplary embodiments provide methods of manufacturing the light transmittance adjusting devices.

According to an aspect of an exemplary embodiment, a light transmittance adjusting device includes: a first electrode; a second electrode; and a first elastomer layer disposed between the first electrode and the second electrode, wherein a light transmittance of the first elastomer layer is variable depending on a voltage applied thereto.

An area of the a light transmitting surface of the first elastomer layer may increase when a voltage is applied to the first elastomer layer.

The first elastomer layer may have a disc-shaped cross-sectional area.

The light transmittance adjusting device may further include a second elastomer layer surrounding an outer circumferential surface of the first elastomer layer, and the second elastomer layer may block light incident thereon.

The light transmittance adjusting device may further include: a third electrode disposed on a first surface of the second elastomer layer and electrically connected to the first electrode; and a fourth electrode disposed on a second surface of the second elastomer layer, opposite the first surface, and electrically connected to the second electrode.

The third electrode and the fourth electrode may not overlap each other.

The first elastomer layer may have a thickness that is equal to or less than a thickness of the second elastomer layer.

The first elastomer layer may have an elasticity that is equal to or greater than an elasticity of the second elastomer layer.

The light transmittance adjusting device may further include a light blocking unit which blocks light incident thereon and which is disposed on one of a light-transmission side and a light-incident side of the first elastomer layer.

The light blocking unit may be disposed on the light-transmission side of the first elastomer layer.

A cross-sectional area of the light blocking unit may correspond to a smallest cross-sectional area of a light transmission area that is defined by the first elastomer layer.

The first elastomer layer may include at least one material selected from a group consisting of silicon, polysiloxanes, polyurethanes, polysilicon-polyurethane, rubber, ethylene-vinyl acetate copolymer, phenolic nitrile rubber, styrene butadiene rubber, polyrther-block-amides, and polyolefins.

The first and second electrodes may be formed of a transparent conductive material that is elastic. The first and second electrodes may be formed of a transparent conductive material having an irregular structure.

According to another aspect of the present invention, an imaging apparatus includes: a light transmittance adjusting device of the above description; an imaging unit which forms an image of an object from light incident through the light transmittance adjusting device; and an image pickup device which converts the image formed by the imaging unit into an electric signal.

According to another aspect of the present invention, a method of manufacturing a light transmittance adjusting device includes: forming an opening in a first elastomer layer; forming a second elastomer layer in the opening of the first elastomer layer; forming a first electrode on a first surface of the second elastomer layer; and forming a second electrode on a second surface of the second elastomer layer, opposite the first surface.

The method may further include, prior to the forming the second electrode, removing a substrate from a first surface of the first elastomer layer, and the forming the second electrode may include forming the second electrode on the second surface of the second elastomer layer and on a second surface of the first elastomer layer, opposite the first surface of the first elastomer layer.

Fluorine may be disposed on the substrate.

The second elastomer layer may have a thickness that is equal to or less than a thickness of the first elastomer layer.

The method may further include stretching the first elastomer layer in a radial direction of the light transmittance adjusting device.

BRIEF DESCRIPTION OF THE DRAWINGS

These and/or other exemplary aspects will become apparent and more readily appreciated from the following description of exemplary embodiments, taken in conjunction with the accompanying drawings in which:

FIG. 2 is a schematic plan view of the light transmittance adjusting device of

DETAILED DESCRIPTION

Reference will now be made in detail to exemplary embodiments illustrated in the accompanying drawings, wherein like reference numerals refer to like elements throughout. In this regard, the described exemplary embodiments may have different forms and should not be construed as being limited to the descriptions set forth herein. Accordingly, the exemplary embodiments are merely described below, by referring to the figures, to explain aspects of the present description.

Figure 1:
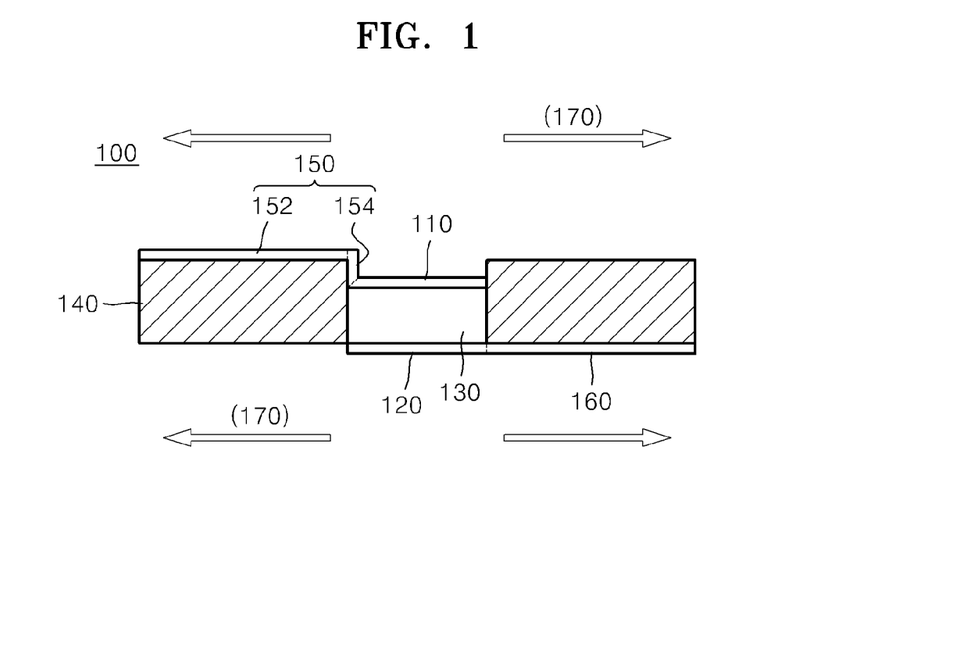
FIG. 1 is a schematic cross-sectional view of a light transmittance adjusting device according to an exemplary embodiment.
Figure 2:
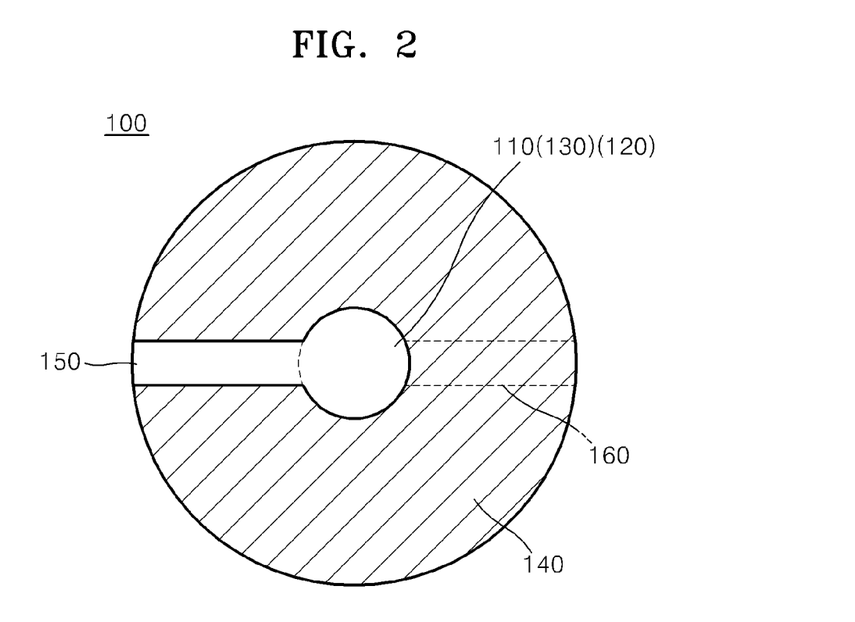

FIG. 1 is a schematic cross-sectional view of a light transmittance adjusting device 100 according to an exemplary embodiment, and FIG. 2 is a schematic plan view of the light transmittance adjusting device 100 of FIG. 1.

Referring to FIGS. 1 and 2, the light transmittance adjusting device 100 includes a first electrode 110, a second electrode 120 separated from the first electrode 110, and a first elastomer layer 130 disposed between the first and second electrodes 110 and 120 and having a light transmittance which is variable depending on an applied voltage.

The first and second electrodes 110 and 120 apply an electric field to the first elastomer layer 130, and may be formed of the same material or materials different from each other.

The first and second electrodes 110 and 120 may be formed of a transparent conductive material that is elastic. For example, the first and second electrodes 110 and 120 may be formed of a carbon nano-structure such as carbon nanotubes (CNT) or graphene, or a conductive polymer such as polypyrrole, polyaniline, polyacetylene, polythiophene, polyphenylene vinylene, polyphenylene sulfide, poly p-phenylene, and polyheterocycle vinylene.

The first and second electrodes 110 and 120 may also be formed of a material that has no elasticity. When the first and second electrodes 110 and 120 are formed of a material having no elasticity, the first and second electrodes 110 and 120 may be realized as a plurality of conductive fine structures forming elastic patterns. The fine structure may be an irregular surface structure that is formed by coupling at least two concave or convex structures having side surfaces inclined to each other. For example, the first and second electrodes 110 and 120 may be formed of a metal oxide such as indium tin oxide (ITO), aluminium zinc oxide (AZO), indium zinc oxide (IZO), tin oxide (SnO2), or In2O3, and a thin film in which metal nano-particles such as Al, Cu, Au, or Ag are distributed.

The first and second electrodes 110 and 120 are formed to have the same shape as a light transmitting surface of the first elastomer layer 130. For example, the first and second electrodes 110 and 120 may be formed as discs.

The first elastomer layer 130 may have a light transmitting property, may be transformable, and may have an elastic property. The first elastomer layer 130 may be formed of a material having elasticity greater than those of the first and second electrodes 110 and 120. The first elastomer layer 130 may include at least one selected from the group consisting of silicon, polysiloxanes, polyurethanes, polysilicon-polyurethans, rubber, ethylene-vinyl acetate copolymer, phenolic nitrile rubber, syrene butadiene rubber, polyrther-block-amides, polyolefins, various gels, and other similar materials.

The first elastomer layer 130 may be disposed as a disc in a region that overlaps both of the first and second electrodes 110 and 120. When the first elastomer layer 130 and the first and second electrodes 110 and 120 form a sandwiched structure, the first elastomer layer 130 expands in a length direction denoted by an arrow 170 and contracts in a thickness direction thereof, according to an applied voltage. The first elastomer layer 130 may be expanded by about 400% or greater in the length direction according to a magnitude of an applied voltage. About 1 kV or greater for about every 1 mm of thickness of the first elastomer layer 130 may be applied to the first elastomer layer 130 before the first elastomer layer 130 shows its maximum displacement. Therefore, the thickness of the first elastomer layer 130 may be reduced so that the first elastomer layer 130 may expand/contract at a relatively low voltage. In order to reduce the thickness of the first elastomer layer 130, a silicon gel may be added in the first elastomer layer 130. The thickness of the first elastomer layer 130 may be about 1 μm or less, for example.

In addition, the light transmittance adjusting device 100 may further include a second elastomer layer 140 surrounding an outer circumferential surface of the first elastomer layer 130. The second elastomer layer 140 may be formed of the same material as the first elastomer layer 130. The second elastomer layer 140 supports the first elastomer layer 130, and restricts the light transmitting surface. Therefore, the second elastomer layer 140 may further include a colored-material, for example, a black material, for blocking light to obtain a light shielding property. When the first and second elastomer layers 130 and 140 are formed of materials different from each other, the second elastomer layer 140 may be formed of a material having an elasticity less than that of the first elastomer layer 130. In addition, the second elastomer layer 140 may have a thickness that is equal to or greater than that of the first elastomer layer 130. For example, the second elastomer layer 140 may have a thickness of tens of μm or less. The second elastomer layer 140 contracts corresponding to the expansion of the first elastomer layer 130, and thus the first and second elastomer layers 130 and 140 are in a feedback relationship.

The light transmittance adjusting device 100 may further include a third electrode 150 disposed on a surface of the second elastomer layer 140 and extending from the first electrode 110, and a fourth electrode 160 disposed on another surface of the second elastomer layer 140 and extending from the second electrode 120. For example, the third electrode 150 may be disposed on an upper surface of the second elastomer layer 140, and the fourth electrode 160 may be disposed on a lower surface of the second elastomer layer 140. The third and fourth electrodes 150 and 160 may be formed as bars, and the third and fourth electrodes 150 and 160 may not overlap each other.

The third and fourth electrodes 150 and 160 may be formed of the same materials or in the same patterns as the first and second electrodes 110 and 120.

When there is a step between the first elastomer layer 130 and the second elastomer layer 140 due to the first elastomer layer 130 having a thickness that is less than that of the second elastomer layer 140, the third electrode 150 may be divided into a terminal electrode 152 that is disposed on the second elastomer layer 140 and a connecting electrode 154, connecting the first electrode 110 and the terminal electrode 152 to each other. In FIG. 1, the third electrode 150 is divided into the terminal electrode 152 and the connecting electrode 152 due to the difference between heights of the first elastomer layer 130 and the second elastomer layer 140. However, exemplary embodiments are not limited thereto. For example, the fourth electrode 160 may be divided into a terminal electrode and a connecting electrode.

The first and second electrodes 110 and 120 expand/contract in response to the expansion/contraction of the first elastomer layer 130, while end portions of the third and fourth electrodes 150 and 160 are fixed. Therefore, the third and fourth electrodes 150 and 160 may receive a voltage more stably than the first and second electrodes 110 and 120.

Operations of the light transmittance adjusting device will be described as follows.

Figure 3A:
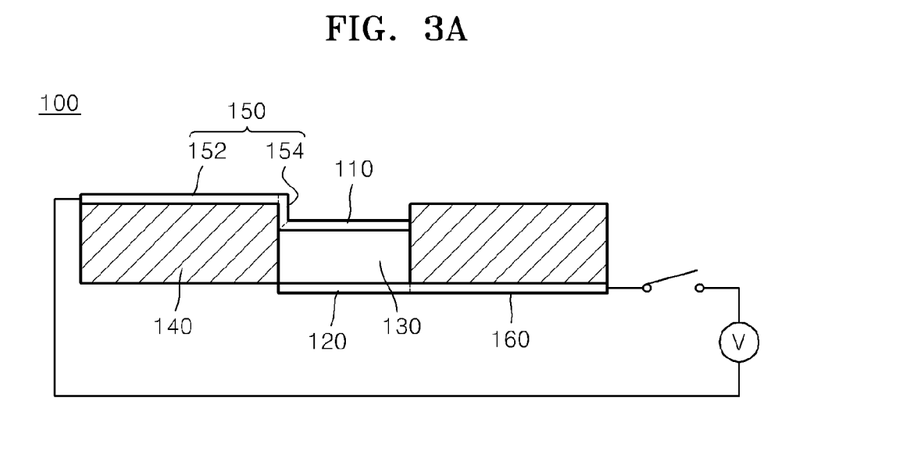
FIGS. 3A and 3B are cross-sectional views of the light transmittance adjusting device of FIG. 1 before and after applying a voltage to the light transmittance adjusting device.
Figure 3B:
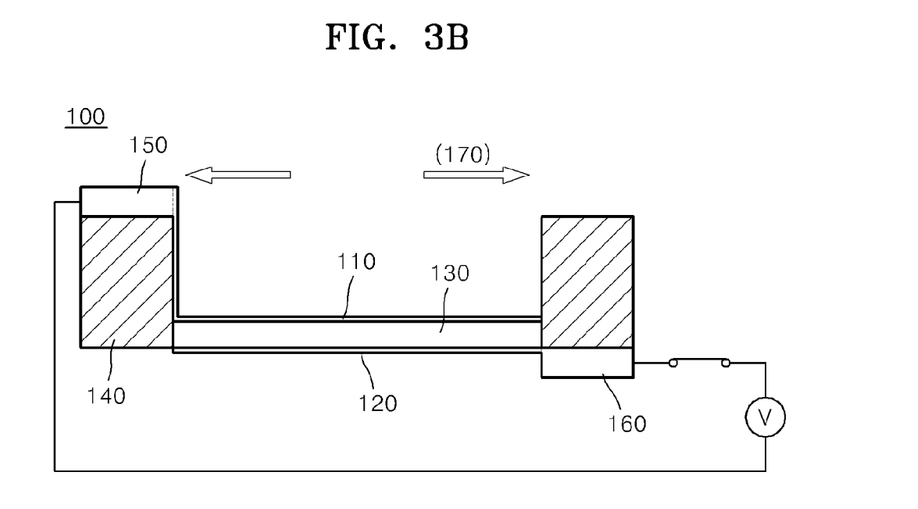

FIG. 3A is a cross-sectional view of the light transmittance adjusting device 100 before applying a voltage to the light transmittance adjusting device 100, and FIG. 3B is a cross-sectional view of the light transmittance adjusting device 100 when a voltage is applied.

When a voltage is not applied to the light transmittance adjusting device 100, the first electrode 110, the second electrode 120, and the first elastomer layer 130 of the light transmittance adjusting device 100 maintain constant sizes due to elastic forces. Each of the third electrode 150, the fourth electrode 160, and the second elastomer layer 140 maintains its constant size in correspondence with each of the first and second electrodes 110 and 120, and the first elastomer layer 130.

When a voltage is applied to the light transmittance adjusting device 100, the first elastomer layer 130, which overlaps with the first and second electrodes 110 and 120, expands in the length direction 170 corresponding to a magnitude of the applied voltage, as shown in FIG. 3B. As shown in FIG. 2, the elastomer layer 130 may be circular. As such, the expansion of the elastomer layer, upon the application of the applied voltage, may be in a radial direction. When the first elastomer layer 130 expands in the length/radial direction 170, the thickness of the first elastomer layer 130 is reduced. On the other hand, even when the voltage is applied to the light transmittance adjusting device 100, the second elastomer layer 140 does not expand in the length/radial direction 170 because the second elastomer layer 140 is not sandwiched between the third and fourth electrodes 150 and 160. However, due to the expansion of the first elastomer layer 130, an inner circumferential surface of the second elastomer layer 140 is expanded corresponding to the expansion of the first elastomer layer 130. On the other hand, an outer circumferential surface of the second elastomer layer 140 is fixed. In addition, the first and second electrodes 110 and 120 are also expanded corresponding to the first elastomer layer 130, while the third and fourth electrodes 150 and 160 are contracted corresponding to the contraction of the second elastomer layer 140. Thus, as the first elastomer layer 130 expands in the radial direction, the second elastomer layer contracts in the radial direction and expands in a thickness direction, as shown in FIG. 3B.

When the application of voltage is suspended, the first elastomer layer 130 returns to its original state, as shown in FIG. 3A. As described above, the light transmitting surface of the first elastomer layer 130 changes due to the application of voltage, and thus an area of the light transmittance of the surface may be easily adjusted according to the expansion/contraction of the first elastomer layer 130.

The light transmittance adjusting device 100 may function as an aperture by adjusting the area of the light transmittance surface. Thus, the light transmittance adjusting device 100 of the present embodiment may function as a shutter according to an application of voltage.

Figure 4:
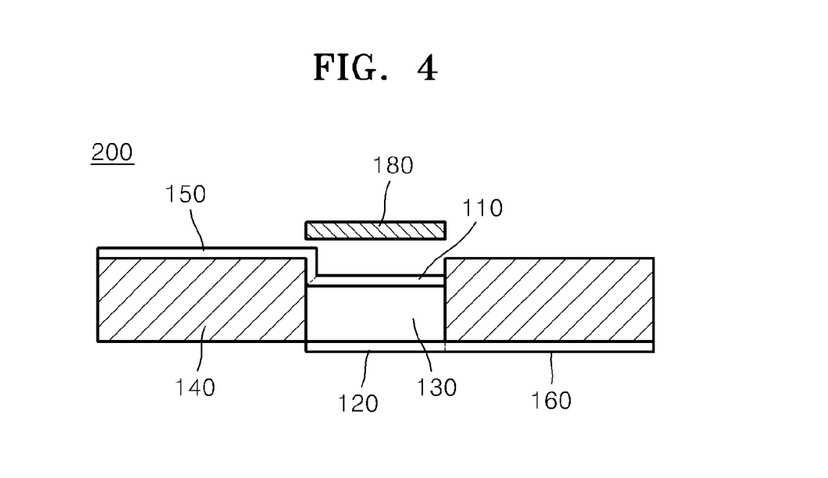
FIG. 4 is a cross-sectional view of a light transmittance adjusting device according to another exemplary embodiment.

FIG. 4 is a cross-sectional view of a light transmittance adjusting device 200 according to another exemplary embodiment.

The light transmittance adjusting device 200 may further include a light blocking unit 180 above a center portion thereof for blocking light transmitted through the first elastomer layer 130. The light blocking unit 180 is disposed in a region facing the light transmitting surface of the first elastomer layer 130, and may have a size corresponding to a minimum size of a surface area of the light transmitting surface of the first elastomer layer 130. For example, the light transmitting surface of the first elastomer layer 130 may be smallest when no voltage is applied to the light transmittance adjusting device 200, and the light blocking unit 180 may have a size corresponding to the light transmitting surface at its smallest, and thereby may block light transmitted through the first elastomer layer 130, when a surface area of the light transmitting surface is its smallest. The light blocking unit 180 may be separated a predetermined distance from the first and second electrodes 110 and 120 so as not to expand/contract according to the applied voltage. In FIG. 4, the light blocking unit 180 is disposed on a side corresponding to the first electrode 110, for example a light-transmission side of the first elastomer layer. However, the light blocking unit 180 may be formed on a side corresponding to the second electrode 120, for example, a light-incident side of the first elastomer layer. In this case, the light blocking unit 180 may block light transmitted toward the first elastomer layer 130.

Figure 5A:
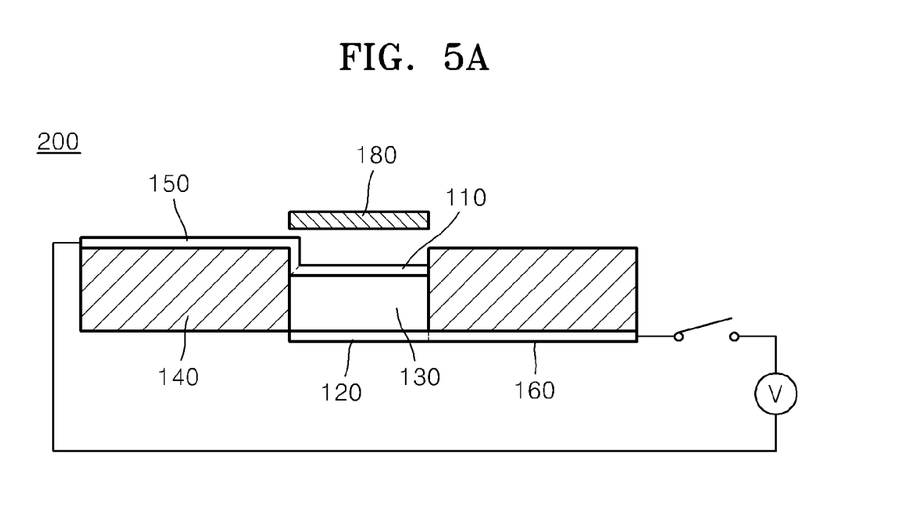
FIGS. 5A and 5B are cross-sectional views of the light transmittance adjusting device of FIG. 4 before and after applying a voltage to the light transmittance adjusting device.
Figure 5B:
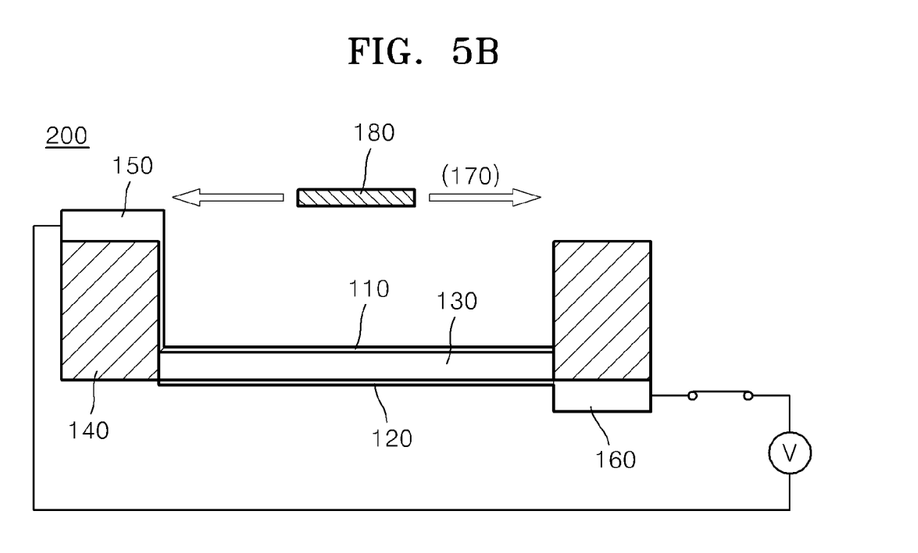

FIGS. 5A and 5B are cross-sectional views of the light transmittance adjusting device 200 before and after applying a voltage to the light transmittance adjusting device 200.

When a voltage is not applied, as shown in FIG. 5A, the first electrode 110, the second electrode 120, and the first elastomer layer 130 of the light transmittance adjusting device 200 maintain constant sizes due to elastic forces, and the light blocking unit 180 blocks light that is transmitted through the first elastomer layer 130. Accordingly, there is no light transmitted through the light transmittance adjusting device 200.

When a voltage is applied to the light transmittance adjusting device 200, as shown in FIG. 5B, the first elastomer layer 130, which overlaps with the first and second electrodes 110 and 120, expands in the length/radial direction 170 corresponding to a magnitude of the applied voltage. When the first elastomer layer 130 expands in the length/radial direction 170, the thickness of the first elastomer layer 130 is reduced. On the other hand, the second elastomer layer 140 is not expanded in the length/radial direction 170 even when the voltage is applied, because the second elastomer layer 140 is not sandwiched between the third and fourth electrodes 150 and 160. That is, the inner circumferential surface of the second elastomer layer 140 expands corresponding to the expansion of the first elastomer layer 130. The outer circumferential surface of the second elastomer layer 140 is fixed. Thus, the second elastomer layer contracts in a length/radial direction, and expands in a thickness direction. Since the first and second electrodes 110 and 120 are elastic, the first and second electrodes 110 and 120 may expand in correspondence with the expansion of the first elastomer layer 130. Therefore, when the voltage is applied to the light transmittance adjusting device 200, a predetermined intensity of light may be transmitted through the light transmittance adjusting device 200 due to the lengthwise/radial expansion of the first elastomer layer 130.

In addition, when the application of the voltage is stopped, the first elastomer layer 130 returns to its original state, as shown in FIG. 5A. As described above, an area of the light transmitting surface of the first elastomer layer 130 is changed by the application of voltage, and thus light may be transmitted or blocked according to the expansion/contraction of the first elastomer layer 130.

A method of manufacturing the light transmittance adjusting device 100 according to an exemplary embodiment will be described with reference to FIGS. 6A through 6H. FIGS. 6A through 6H are schematic cross-sectional views illustrating the method of manufacturing the light transmittance adjusting device 100 according to an exemplary embodiment.

Figure 6A:
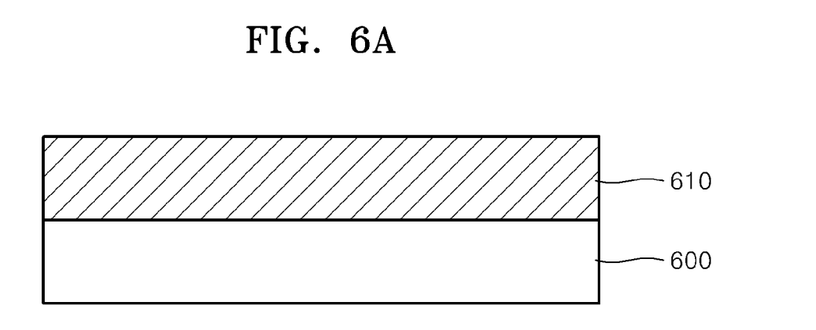
FIGS. 6A through 6H are schematic diagrams illustrating a method of manufacturing a light transmittance adjusting device according to an exemplary embodiment.

As shown in FIG. 6A, a second elastomer layer 610 is formed on a substrate 600. The substrate 600 may be a crystalline substrate such as Si or GaAs. Moreover, a substrate on which fluorine is formed may be used. The substrate on which fluorine is formed may have an appropriate level of an attaching force with respect to the second elastomer layer 610, and thus the second elastomer layer 610 may be easily attached/detached onto/from the substrate 600. The second elastomer layer 610 may be formed as a circular shape having a thickness of about tens of μm.

Figure 6B:
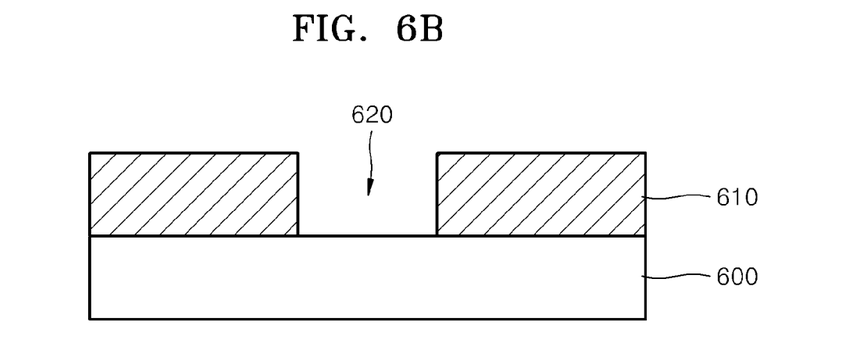

As shown in FIG. 6B, the second elastomer layer 610 is etched so as to expose a center portion of the substrate 600, and thus an opening 620 is formed. The second elastomer layer 610 may be etched by laser, and the opening 620 may have a circular cross-sectional shape.

Figure 6C:
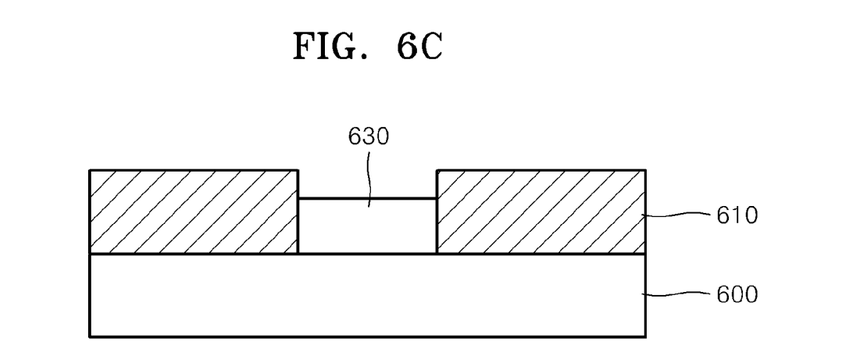

As shown in FIG. 6C, a first elastomer layer 630 is formed on a surface of the substrate 600 exposed by the opening 620. A thickness of the first elastomer layer 630 may be equal to or less than that of the second elastomer layer 610. The first elastomer layer 610 may be chemically treated in order to increase a surface coupling force of the first elastomer layer 610.

Figure 6D:
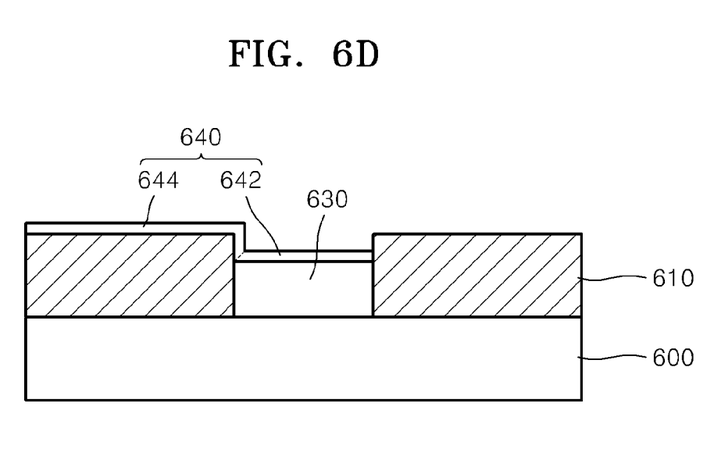

As shown in FIG. 6D, an upper electrode 640 including a first electrode 642 and a third electrode 644 is formed on upper surfaces of the first elastomer layer 610 and the second elastomer layer 630. For example, the first electrode 642 may be formed on the entire upper surface of the first elastomer layer 610, and the third electrode 644 may be formed on a part of the upper surface of the second elastomer layer 630. The first electrode 642 may have a disc shape, and the third electrode 644 may have a bar shape. The first and third electrodes 642 and 644 may be formed using an infiltration method or a vapor phase polymerization method.

Figure 6E:
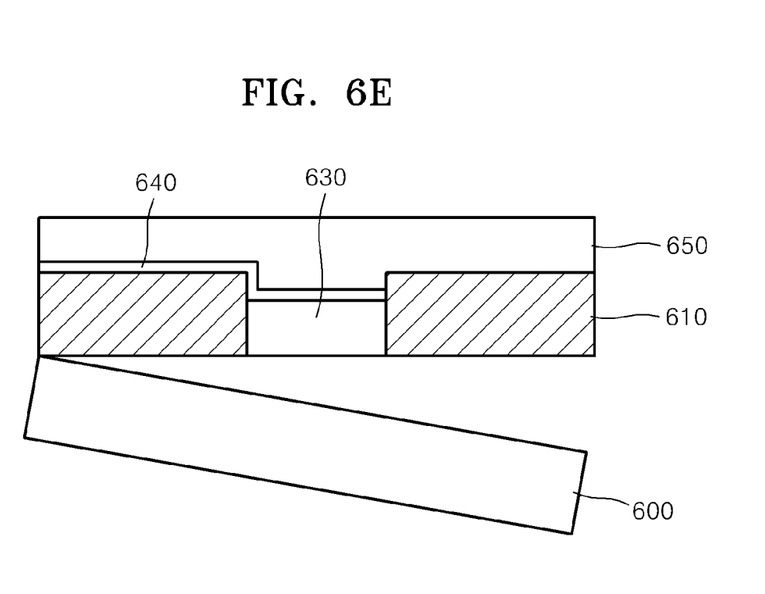

As shown in FIG. 6E, the substrate 600 is separated from the first and second elastomer layers 610 and 630. Before separating the substrate 600, a supporting film 650 may be formed on upper surfaces of the upper electrode 640 and the first elastomer layer 610. The supporting film 650 is temporarily used to isolate the substrate 600 and to enable the formation of a lower electrode 660 that will be described later, and may be formed of a material that is easily isolated from the upper electrode 640 and the second elastomer layer 610.

Figure 6F:
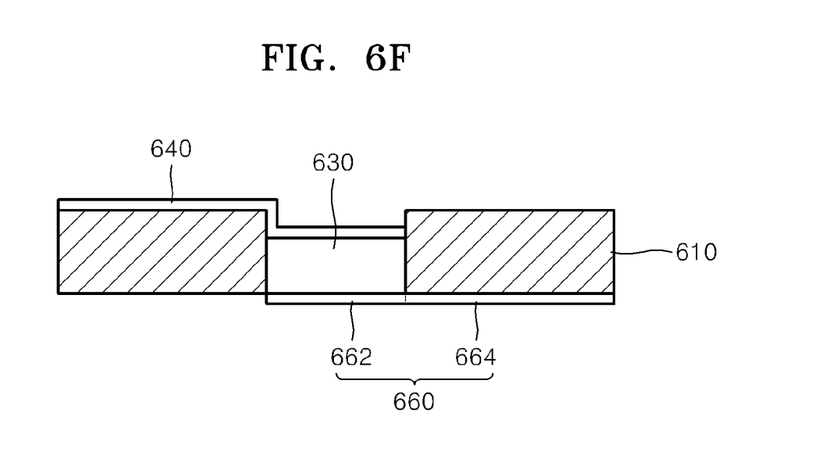

As shown in FIG. 6F, the lower electrode 660 including a second electrode 662 and a fourth electrode 664 is formed on lower surfaces of the first elastomer layer 630 and the second elastomer layer 610. The second electrode 662 may be formed on the entire lower surface of the first elastomer layer 630, and the fourth electrode 664 may be formed on a part of the lower surface of the second elastomer layer 610. In addition, the second electrode 662 may have a disc shape, and the fourth electrode 664 may have a bar shape. The fourth electrode 664 may be formed so as not to overlap the third electrode 644. The light transmittance adjusting device 200 is thereby manufactured through the processes illustrated in FIGS. 6A through 6F.

Figure 6G:
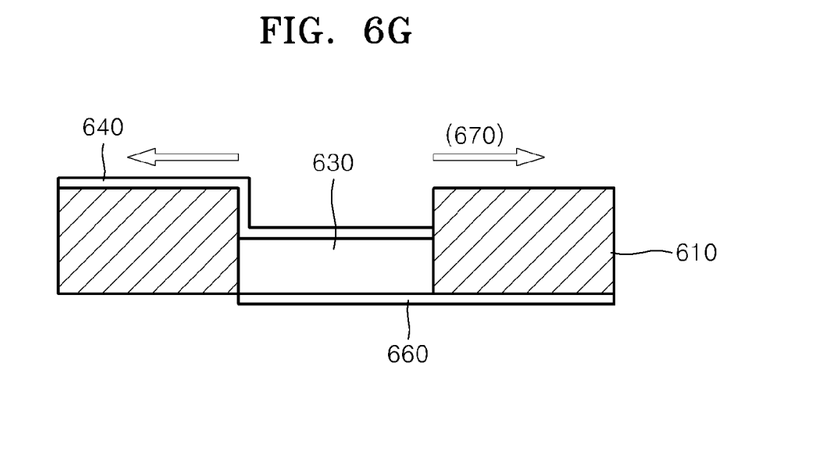

As shown in FIG. 6G, the light transmittance adjusting device manufactured through the processes illustrated in FIGS. 6A through 6F may be stretched in a length/radial direction 670 and thus the first elastomer layer 630 may linearly expand/contract according to a magnitude of an applied voltage. In FIG. 6G, the first and second elastomer layers 630 and 610 are stretched together; however, exemplary embodiments are not limited thereto. For example, only the first elastomer layer 630 may be stretched. In general, the elastomer layer may have inflection points, and may not expand/contract linearly according to a magnitude of an applied voltage. However, when the first elastomer layer 630 is stretched, the first elastomer layer 630 may linearly expand/contract according to a magnitude of an applied voltage. In addition, a material having a higher elasticity than that of the first elastomer layer 630 may be disposed on the first elastomer layer 630.

Figure 6H:
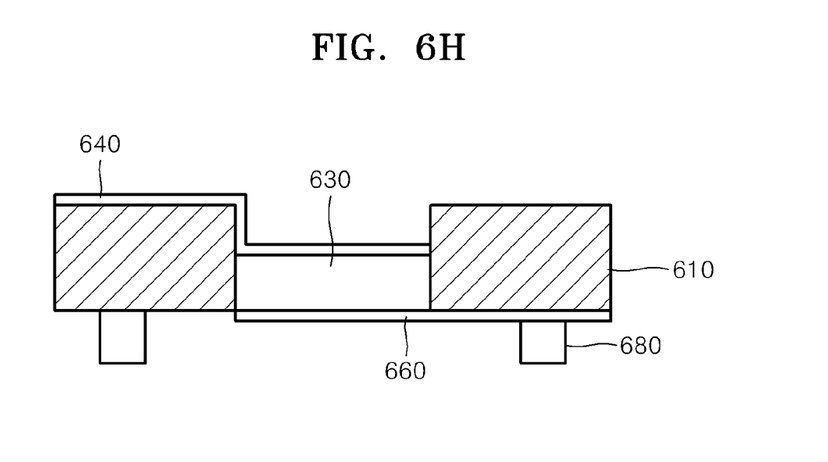

As shown in FIG. 6H, edges of the second elastomer layer 610 may be attached to a housing 680 that supports the light transmittance adjusting device 200.

The light transmittance adjusting device may be used as a movable aperture of an imaging apparatus.

Figure 7:
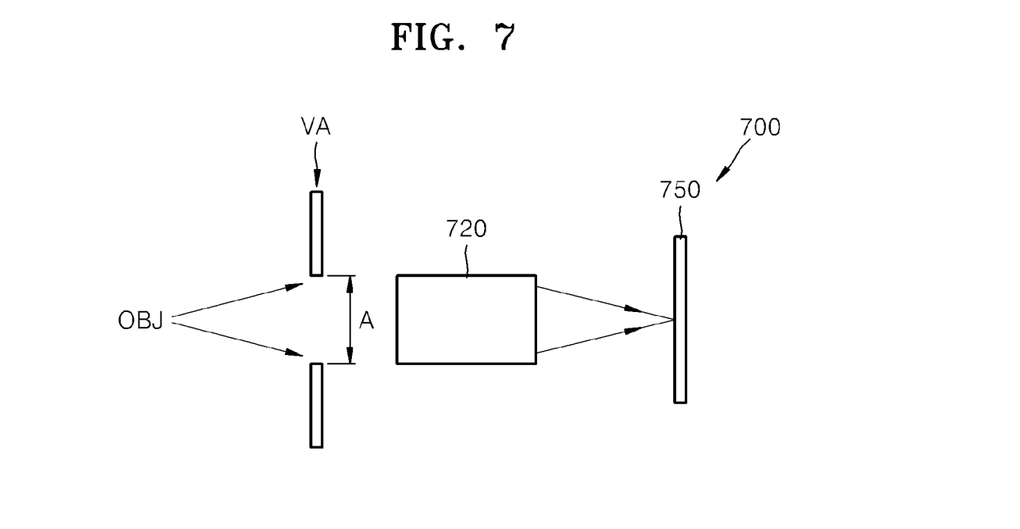
FIG. 7 is a schematic diagram of an imaging apparatus according to an exemplary embodiment.

FIG. 7 is a schematic diagram of an imaging apparatus 700 according to an exemplary embodiment.

The imaging apparatus 700 includes a movable aperture VA having an adjustable aperture A through which light from an object OBJ is incident, an imaging unit 720 for forming an image of the object OBJ from the light incident through the movable aperture VA, and an image pickup device 750 for converting the image formed by the imaging unit 720 into an electric signal.

The movable aperture VA may be one of the light transmittance adjusting devices 100 and 200 described above, and the imaging unit 720 may include one or more lenses. The image pickup device 750 may be a charge-coupled device (CCD) or a complementary metal-oxide semiconductor (CMOS).

Since the movable aperture VA has a structure including the elastomer layers, the movable aperture VA has a relatively small volume. Therefore, light transmittance adjusting devices according to exemplary embodiments may be used in medical imaging apparatuses such as optical coherence tomography (OCT) systems or microscopes, or image pickup apparatuses such as mobile imaging apparatuses.

According to one or more exemplary embodiments, a small-sized light transmittance adjusting devices may be realized by using the elastomer having the surface of which light transmittance is variable.

According to one or more exemplary embodiments, a light transmittance adjusting device has a simple structure that does not need an external driving pump or a mechanical apparatus, and may be manufactured easily. Therefore, a light transmittance adjusting device according to one or more exemplary embodiments may be used as a movable aperture or an optical shutter used in a medical imaging apparatus or a camera.

It should be understood that the exemplary embodiments described herein should be considered in a descriptive sense only and not for purposes of limitation. Descriptions of features or aspects within each embodiment should typically be considered as available for other similar features or aspects in other embodiments. The scope of the inventive concept is not to be construed as being limited to the description provided herein, and is to be construed by the attached claims and their equivalents.

What is claimed is:

1. A light transmittance adjusting device comprising:
   a first electrode;
   a second electrode; and
   a first elastomer layer disposed between the first electrode and the second electrode;
   a second elastomer layer having an opening in which the first elastomer layer is disposed,
   wherein the first elastomer layer is transparent and the second elastomer layer is opaque, and
   wherein the first elastomer layer expands in a first direction while the second elastomer layer contracts in the first direction depending on a voltage applied thereto, such that an area of a light transmitting surface of the first elastomer layer is variable.

2. The light transmittance adjusting device of claim 1, wherein the area of the light transmitting surface of the first elastomer layer increases when a voltage is applied to the first elastomer layer.

3. The light transmittance adjusting device of claim 1, wherein the first elastomer layer has a disc-shaped cross-sectional area.

4. The light transmittance adjusting device of claim 1, further comprising:
   a third electrode disposed on a first surface of the second elastomer layer and electrically connected to the first electrode; and
   a fourth electrode disposed on a second surface of the second elastomer layer, opposite the first surface, and electrically connected to the second electrode.

5. The light transmittance adjusting device of claim 4, wherein the third electrode and the fourth electrode do not overlap each other.

6. The light transmittance adjusting device of claim 1, wherein the first elastomer layer has a thickness that is equal to or less than a thickness of the second elastomer layer.

7. The light transmittance adjusting device of claim 1, wherein the first elastomer layer has an elasticity that is equal to or greater than an elasticity of the second elastomer layer.

8. The light transmittance adjusting device of claim 1, further comprising a light blocking unit which blocks light incident thereon and which is disposed on one of a light-transmission side and a light-incident side of the first elastomer layer.

9. The light transmittance adjusting device of claim 8, wherein the light blocking unit is disposed on the light-transmission side of the first elastomer layer.

10. The light transmittance adjusting device of claim 9, wherein a cross-sectional area of the light blocking unit corresponds to a smallest cross-sectional area of a the light transmitting surface of the first elastomer layer.

11. The light transmittance adjusting device of claim 1, wherein the first elastomer layer comprises at least one material selected from a group consisting of silicon, polysiloxanes, polyurethanes, polysilicon-polyurethane, rubber, ethylene-vinyl acetate copolymer, phenolic nitrile rubber, styrene butadiene rubber, polyrther-block-amides, and polyolefins.

12. The light transmittance adjusting device of claim 1, wherein the first and second electrodes comprise a transparent conductive material that is elastic.

13. The light transmittance adjusting device of claim 1, wherein the first and second electrodes comprise a transparent conductive material having an irregular structure.

14. An imaging apparatus comprising:
   the light transmittance adjusting device of claim 1;
   an imaging unit which forms an image of an object from light transmitted through the light transmittance adjusting device; and
   an image pickup device which converts the image formed by the imaging unit into an electric signal.

15. A method of manufacturing a light transmittance adjusting device, the method comprising:
   forming an opening in a first elastomer layer;
   forming a second elastomer layer in the opening of the first elastomer layer;
   forming a first electrode on a first surface of the second elastomer layer; and
   forming a second electrode on a second surface of the second elastomer layer, opposite the first surface, and
   wherein the first elastomer layer is transparent and the second elastomer layer is opaque, and
   wherein the first elastomer layer expands in a first direction while the second elastomer layer contracts in the first direction depending on a voltage applied thereto such that an area of a light transmitting surface of the first elastomer layer is variable.

16. The method of claim 15, further comprising:
   prior to the forming the second electrode, removing a substrate from a first surface of the first elastomer layer,
   wherein the forming the second electrode comprises forming the second electrode on the second surface of the second elastomer layer and on a second surface of the first elastomer layer, opposite the first surface of the first elastomer layer.

17. The method of claim 16, wherein fluorine is disposed on the substrate.

18. The method of claim 15, wherein the second elastomer layer has a thickness that is equal to or less than a thickness of the first elastomer layer.

* * * * *